(12) United States Patent
Rupp et al.

(10) Patent No.: US 11,738,349 B2
(45) Date of Patent: Aug. 29, 2023

(54) DEVICE FOR COUPLING A CARTRIDGE FOR A LAB-ON-A-CHIP ANALYSIS DEVICE, LAB-ON-A-CHIP ANALYSIS DEVICE AND METHOD FOR COUPLING A CARTRIDGE FOR A LAB-ON-A-CHIP ANALYSIS DEVICE

(71) Applicant: Robert Bosch GmbH, Stuttgart (DE)

(72) Inventors: Jochen Rupp, Stuttgart (DE); Daniel Czurratis, Aalen (DE); Karsten Seidl, Mülheim an der Ruhr (DE); Thomas Jelinek, Klosterlechfeld (DE)

(73) Assignee: Robert Bosch GmbH, Stuttgart (DE)

( * ) Notice: Subject to any disclaimer, the term of this patent is extended or adjusted under 35 U.S.C. 154(b) by 376 days.

(21) Appl. No.: 16/982,961

(22) PCT Filed: Apr. 18, 2019

(86) PCT No.: PCT/EP2019/060063
§ 371 (c)(1),
(2) Date: Sep. 21, 2020

(87) PCT Pub. No.: WO2019/202068
PCT Pub. Date: Oct. 24, 2019

(65) Prior Publication Data
US 2021/0016289 A1 Jan. 21, 2021

(30) Foreign Application Priority Data
Apr. 20, 2018 (DE) ..................... 10 2018 206 066.5

(51) Int. Cl.
*B01L 99/00* (2010.01)
*G01N 35/00* (2006.01)
*B01L 9/00* (2006.01)

(52) U.S. Cl.
CPC ................. *B01L 9/527* (2013.01); *B01L 9/50* (2013.01); *B01L 2200/025* (2013.01); *B01L 2200/026* (2013.01); *B01L 2200/16* (2013.01)

(58) Field of Classification Search
None
See application file for complete search history.

(56) References Cited

U.S. PATENT DOCUMENTS

| 2004/0222091 | A1  | 11/2004 | Lauks et al. |
| 2011/0201099 | A1* | 8/2011  | Anderson ............... G01N 1/10 422/68.1 |

(Continued)

FOREIGN PATENT DOCUMENTS

| WO | 2017/095845 A1 | 6/2017 |
| WO | 2017/108387 A1 | 6/2017 |

OTHER PUBLICATIONS

International Search Report corresponding to PCT Application No. PCT/EP2019/060063, dated May 28, 2019 (German and English language document) (5 pages).

(Continued)

*Primary Examiner* — Paul S Hyun
(74) *Attorney, Agent, or Firm* — Maginot, Moore & Beck LLP

(57) ABSTRACT

In a device for coupling a cartridge for a lab-on-a-chip analysis device, the cartridge has at least one pneumatic port and at least one reagent chamber. The device has a receiving region and a clamping unit. The receiving region is shaped to receive the cartridge. The clamping unit includes a pneumatic interface for pneumatically contacting the pneumatic port and a punch for insertion into the reagent chamber. The clamping unit is arranged adjacent to the receiving region and is designed to perform a first translatory motion toward the receiving region in order to bring the pneumatic interface into contact with the pneumatic port. Furthermore, (Continued)

the clamping unit is designed to perform a second translatory motion toward the receiving region following the first translatory motion in order to insert the punch into the reagent chamber.

12 Claims, 9 Drawing Sheets

(56) References Cited

U.S. PATENT DOCUMENTS

| | | |
|---|---|---|
| 2013/0137591 A1 | 5/2013 | Clemens et al. |
| 2017/0113221 A1 | 4/2017 | Hoffman et al. |
| 2018/0015474 A1 | 1/2018 | Arlett et al. |

OTHER PUBLICATIONS

Lin, Bingcheng, "Topics in Current Chemistry." Microfluidics: Technologies and Applications. Springer, 2011; pp. 2-3, 141-142, and 250-251, ISBN 978-.-642-23049-3.

* cited by examiner

DEVICE FOR COUPLING A CARTRIDGE FOR A LAB-ON-A-CHIP ANALYSIS DEVICE, LAB-ON-A-CHIP ANALYSIS DEVICE AND METHOD FOR COUPLING A CARTRIDGE FOR A LAB-ON-A-CHIP ANALYSIS DEVICE

This application is a 35 U.S.C. § 371 National Stage Application of PCT/EP2019/060063, filed on Apr. 18, 2019, which claims the benefit of priority to Serial No. DE 10 2018 206 066.5, filed on Apr. 20, 2018 in Germany, the disclosures of which are incorporated herein by reference in their entirety.

BACKGROUND

The disclosure starts out from a device or a method as described in detail below.

In vitro diagnostics (IVD) is a field of medical products which, from human samples, measure specific parameters such as a concentration of a molecule, the presence of a defined DNA sequence or a composition of blood, in order to permit a diagnosis and a treatment decision. This can take place in a chain of several laboratory steps, wherein the sample can be conditioned such that the target parameter is able to be measured without interference. Various laboratory methods can be applied, each using equipment suitable for the specific procedure. In analyzers used for laboratory diagnosis close to the patient, so-called point-of-care devices, such in vitro diagnostic tests can be carried out in one device in order to reduce the number of manual steps performed by the user. The sample can be introduced into a disposable cartridge, which can contain the liquid and solid reagents used for the biochemical reactions. Liquid reagents can be safely sealed on the cartridge and stored in a stable manner. After the cartridge has been placed in the analyzer, the diagnostic test can be processed fully automatically. To ensure that the reagents contained in the cartridge can be released into the microfluidic system, often referred to as a lab-on-a-chip, the mechanical punches described in WO 2017108387 can be used, which mechanically pierce through sealing foils and release the liquids. The liquids in the cartridge can be moved in a targeted manner in the fluidic network of the lab-on-a-chip system by the pneumatic actuation of flexible membranes in valves and chambers by means of positive pressure and negative pressure.

SUMMARY

Against this background, the approach presented here proposes a device for coupling a cartridge for a lab-on-a-chip analyzer, a lab-on-a-chip analyzer, and a method for coupling a cartridge for a lab-on-a-chip analyzer. With the measures set forth herein, advantageous developments and improvements of the device are possible.

With this approach, a device for a lab-on-a-chip analyzer is proposed with which a cartridge with a microfluidic system can be coupled to a pneumatic interface by means of a translatory movement in order to apply a pneumatic pressure, and with which a punch can be inserted into a reagent chamber of the cartridge by the translatory movement, in order to release reagent. For this purpose, a cartridge can be received in the device and brought into pneumatic contact. Advantageously, the device permits a particularly compact structure. Moreover, the device can be produced cost-effectively by virtue of a single mechanical actuation unit for the pneumatic contacting and for introducing the punch. Also of advantage is the possibility of the chronological sequence of coupling the pneumatic interface and introducing the punch into the reagent chamber, in order to prevent the reagent from entering the network of the microfluidic system when the reagent is released.

A device for coupling a cartridge for a lab-on-a-chip analyzer is proposed. The cartridge has at least one pneumatic port and at least one reagent chamber. The device has a receiving region and a clamping unit. The receiving region is configured to receive the cartridge. The clamping unit comprises a pneumatic interface for pneumatically contacting the pneumatic port, and a punch for introducing into the reagent chamber. The clamping unit is arranged adjacent to the receiving region and is designed to execute a first translatory movement in the direction of the receiving region in order to bring the pneumatic interface into contact with the pneumatic port. Additionally, the clamping unit is designed to execute a second translatory movement in the direction of the receiving region, subsequent to the first translatory movement, in order to insert the punch into the reagent chamber.

The cartridge can be a microfluidic lab-on-a-chip cartridge. The cartridge can comprise one or more reagent chambers which can be filled for example with liquid reagents and can be sealed with a sealing foil. The cartridge can comprise a network of pneumatic and fluidic channels, which are separated from each other by a flexible membrane. The flexible membrane can be deflected, for example in response to a pneumatic pressure, and thereby move liquids in the network. The at least one pneumatic port can be the interface in the cartridge to the device or to the lab-on-a-chip analyzer, in order to convey the positive or negative pressure to the cartridge, and can be arranged on the upper face and underside of the cartridge.

The device can, for example, be part of the lab-on-a-chip analyzer. The clamping unit can for example be arranged under the receiving region. The clamping unit can be made of metal, for example of aluminum or of stainless steel, or of one or more plastics and can be produced, for example, by milling, die casting or 3D printing. According to one embodiment, the insertion of the punch into the reagent chamber can begin only with the second translatory movement, such that the punch, during the first translatory movement, is not yet inserted into the reagent chamber. According to an alternative embodiment, the punch can be already partially inserted into the reagent chamber by the first translatory movement. In this case, the punch can be inserted further into the reagent chamber by the second translatory movement. The first and second translatory movements can bring about, on the one hand, a pressing movement of the pneumatic interface onto the pneumatic port and, on the other hand, an insertion movement of the punch into the reagent chamber. Depending on the design, the pressing movement and the insertion movement can partly overlap. Thus, the pressing movement proceeds minimally (full force effect), while the one or more punches are fully introduced by the insertion movement. This can be the case, for example, if an elastic component (sealing lip) is used. The translatory, i.e. rectilinear, movement of the clamping unit can be effected by a suitable drive mechanism, for example by a spindle motor or step motor. The first and second translatory movements can run along the same movement axis. The second translatory movement can directly succeed the first translatory movement, such that a continuous overall movement can be obtained. When the device is arranged in a lab-on-a-chip analyzer ready to operate, the first and second translatory movements can be executed vertically or obliquely upward. Alternatively, the movements can also be executed vertically or obliquely downward or, depending on the arrangement of the cartridge in the lab-on-a-chip analyzer, also horizontally. According to one embodiment, the cartridge can be inclined by 30 degrees, for example, so as to utilize the force of gravity, such that the translatory movement can likewise run obliquely. According to one embodiment, the translatory movements can be executed perpendicularly with respect to a main plane of the cartridge, when the cartridge is arranged in the lab-on-a-chip analyzer. The pneumatic interface can be configured as an interface for the pneumatic contacting of the pneumatic port, in order to allow compressed air to pass from the pneumatic interface to the pneumatic port. The punch can be configured to penetrate partially or completely into the reagent chamber in order to release reagent in the cartridge. For this purpose, the punch can for example pierce the sealing foil and additionally or alternatively deflect the flexible membrane.

According to one embodiment, the clamping unit can have a support on which the punch is arranged. In addition, the clamping unit can have a piston which is movable relative to the support and on which the pneumatic interface is arranged. The piston can thus be mounted movably with respect to the support. Moreover, the clamping unit can have a spring mechanism with at least one spring. The spring can be coupled to the support and the piston in order to be deformed in response to the first translatory movement. The support can be configured as a plate, for example. The punch can be mounted on the support or partially worked into the support. Alternatively, the punch can be part of a further clamping unit and can thus be arranged on a corresponding counterpart support or a corresponding counterpart plate. The piston can also be designated as a manifold. The piston can be mounted movably on the support, for example by means of two set screws. Thus, the piston can be seen as a movable part. The piston can execute a movement relative to the support. A direction of a relative movement between the piston and the support can here correspond to a direction of the first and second translatory movement. The spring mechanism can, for example, be coupled to the set screws. The spring can be further deformed in response to the second translatory movement. Depending on the design, the spring can be compressed or stretched during the first translatory movement and the second translatory movement. By virtue of the deformation of the spring, the spring is able to provide a spring force by means of which the piston is pressed in the direction of the cartridge. The spring can be a compression spring, for example. The piston can, for example, be configured such that, before the first translatory movement of the clamping unit, the pneumatic interface projects in relation to the support, which is advantageous as regards the pneumatic contacting. This embodiment permits particularly exact contacting of the pneumatic interface with the pneumatic port. Moreover, by virtue of the spring force of the spring mechanism, a uniform pressing force of the piston and thus of the pneumatic interface onto the cartridge can be permitted, which advantageously reduces the adjustment tolerance.

If the clamping unit comprises a piston, the piston can, according to one embodiment, have at least one pneumatic switching valve fluidically coupled to the pneumatic interface. The switching valve can be configured to switch between a positive pressure and a negative pressure. The switching valve can be configured to forward a delivered pneumatic pressure, for example in the form of air or gas. Moreover, the switching valve can be designed to release the pneumatic pressure to the pneumatic port and thus to the cartridge when the pneumatic interface makes contact with the pneumatic port. The pneumatic interface or the pneumatic port can additionally have an elastic seal in order to permit a pneumatically tight connection.

Moreover, the clamping unit can, according to one embodiment, have at least one positioning pin which is configured to position the cartridge. The positioning pin can be configured, for example, to engage at least partially in the cartridge in order to position the cartridge. For this purpose, the cartridge can, for example, comprise a guide frame, which has a correspondingly shaped hole for the engagement of the positioning pin. The clamping unit can also have a plurality of positioning pins. Advantageously, the cartridge can be positioned exactly by the positioning pin, for example by means of the first translatory movement, which is advantageous for example as regards the contacting of the pneumatic interface with the pneumatic port and can contribute to reducing the adjustment tolerance. The positioning in the cartridge plane can lie, for example, in the sub-millimeter range, for example in a range of 0.3 millimeter.

Moreover, the clamping unit according to one embodiment can have a further interface for thermal contacting of the cartridge. Additionally or alternatively, the clamping unit can have an interface for optical contacting of the cartridge. The contacting of the cartridge with the further interface can take place by means of the first translatory movement. Moreover, the clamping unit can have an interface for mechanical contacting of the cartridge. If the clamping unit comprises a piston, the further interface can moreover have, before the first translatory movement of the clamping unit, a projection in relation to the support and can be brought into contact with the cartridge by the spring of the spring mechanism. For the thermal contacting, the clamping unit for example and/or the further clamping unit can have one or more heating zones. Additionally or alternatively, the clamping unit and/or the further clamping unit can have one or more cooling zones. Thus, the zones suitable for temperature control can be arranged on the support of the clamping unit and additionally or alternatively on a counterpart support or counterpart plate of the further clamping unit. For the optical contacting, the clamping unit can have an optics unit, for example. The optics unit can for example comprise a camera chip with optical filter elements, or photodetectors, or one or more objective lenses, or LEDs with optical color filters for fluorescence excitation and optical detection, or a combination of the elements mentioned. According to one embodiment, the optics unit comprises a light-guiding hollow cylinder or light-guiding hollow cone, which is pressed onto the cartridge to screen off the ambient light. For the mechanical contacting, the clamping unit can have for example an ultrasonically operated sonotrode in order to bring about within a reagent volume, by means of movement of a membrane of the cartridge, cavitation for cell lysis. According to this embodiment, the device can advantageously be used for contacting the cartridge with further interfaces, which advantageously permits a compact structure.

According to one embodiment, the device can moreover comprise a drive mechanism which is designed to effect the first and second translatory movement of the clamping unit. The drive mechanism can be designed, for example, to bring about, by means of the second translatory movement, a pressing force in the range of up to 150 Newton per reagent chamber in order to release the reagent. The drive mechanism can for example comprise a spindle motor or a stepper motor. Advantageously, by means of a mechanical actuation unit, different mechanical procedures can thus be carried out, such as docking of the pneumatic interface and introduction of the punch, which permits a compact structure and a cost-effective design.

According to one embodiment, the device can also have a further clamping unit which is arranged adjacent to the receiving region. In addition, the further clamping unit can be arranged lying opposite the clamping unit. In this case, the clamping unit and the further clamping unit can be designed to clamp the cartridge, arranged in the receiving region, for contacting the pneumatic port and for introducing the punch between the clamping unit and the further clamping unit. The further clamping unit can be designed corresponding to an abovementioned embodiment of the clamping unit. Alternatively, the clamping unit can also be mounted fixedly, for example on a housing of the lab-on-a-chip analyzer. In this case, the clamping unit can be moved in the direction of the further clamping unit by means of the first and second translatory movement. Advantageously, this embodiment affords an exact positioning and therefore a uniform pressing force on the cartridge, which permits a compact structure particularly in terms of the adjustment tolerance. Additionally or alternatively, the further clamping unit can have the further interface, for example the further interface for the optical contacting of the cartridge. This is advantageous for being able to achieve a positioning accuracy in the micrometer range for the further interface.

If the device comprises the further clamping unit, the further clamping unit according to one illustrative embodiment can have a further pneumatic interface for pneumatically contacting a further pneumatic port of the cartridge. The further clamping unit can be fixedly mounted, for example. The further pneumatic port can moreover have a switching valve as described above. This embodiment is advantageous if the cartridge has for example two or more pneumatic ports arranged on different sides of the cartridge. In this case, the pneumatic port, the further pneumatic port and several pneumatic ports can advantageously be contacted with a uniform pressing force.

Additionally or alternatively, the further clamping unit can be designed to execute a further translatory movement in the direction of the receiving region. According to this embodiment, the clamping units can be designed to reduce the distance between them by means of the translatory movement, they can move toward each other by mechanical actuation. In this case, the drive mechanism can be configured to effect the further translatory movement. The clamping unit and the further clamping unit can be configured to clamp between them the cartridge for contacting the pneumatic interface and for introducing the punch. If the cartridge has for example a flexible membrane and several reagent chambers filled with liquids as liquid reagents, the deflection of the flexible membrane by means of pneumatic actuation and thus the movement of the liquids by means of the contacting of the pneumatic interface with the pneumatic port of the further pneumatic interface with the further pneumatic port can take place sequentially, which advantageously permits further possible uses of the device in the processing of the liquids. For this purpose, the further translatory movement of the further clamping unit can be counter to the translatory movements of the clamping unit.

As has already been mentioned, the clamping unit can be designed to execute the first translatory movement in order to insert the punch partially into the reagent chamber, and designed to execute the second translatory movement in order to insert the punch deeper into the reagent chamber. Thus, the whole translatory movement can be shortened, since the insertion of the punch into the reagent chamber has already begun during the process of pressing the pneumatic interface onto the pneumatic port.

A lab-on-a-chip analyzer is also proposed. The lab-on-a-chip analyzer comprises an embodiment of the abovementioned device, a pressure mechanism for making available a pneumatic pressure for the pneumatic interface, and a housing with a cartridge opening which leads into the receiving region and through which the cartridge is introduced.

A method for coupling a cartridge for a lab-on-a-chip analyzer using an embodiment of the abovementioned device is moreover proposed. The cartridge has at least one pneumatic port and at least one reagent chamber. The method comprises a step of the first translatory movement and a step of the second translatory movement. In the step of the first translatory movement, the clamping unit is moved in the direction of the receiving region, in order to bring the pneumatic interface into contact with the pneumatic port. In the step of the second translatory movement, the clamping unit is moved in the direction of the receiving region, in order to insert the punch into the reagent chamber, wherein the second translatory movement is subsequent to the first translatory movement. With the step of the first translatory movement, compressed air can be introduced from the pneumatic interface to the pneumatic port. If the cartridge comprises a microfluidic system with a plurality of reagent chambers and a flexible membrane, the flexible membrane can be deflected by the introduction of compressed air, so as to move liquids contained in the reagent chambers. With the step of the second translatory movement, the punch can be inserted partially or completely into the reagent chamber in order to release reagents.

BRIEF DESCRIPTION OF THE DRAWINGS

Illustrative embodiments of the approach presented here are shown in the drawings and are explained in more detail in the description below. In the drawings.

DETAILED DESCRIPTION

In the following description of expedient illustrative embodiments of the present disclosure, the elements shown in the various figures and having similar effects are designated by the same or similar reference signs, thereby avoiding repeated description of these elements.

Figure 1:
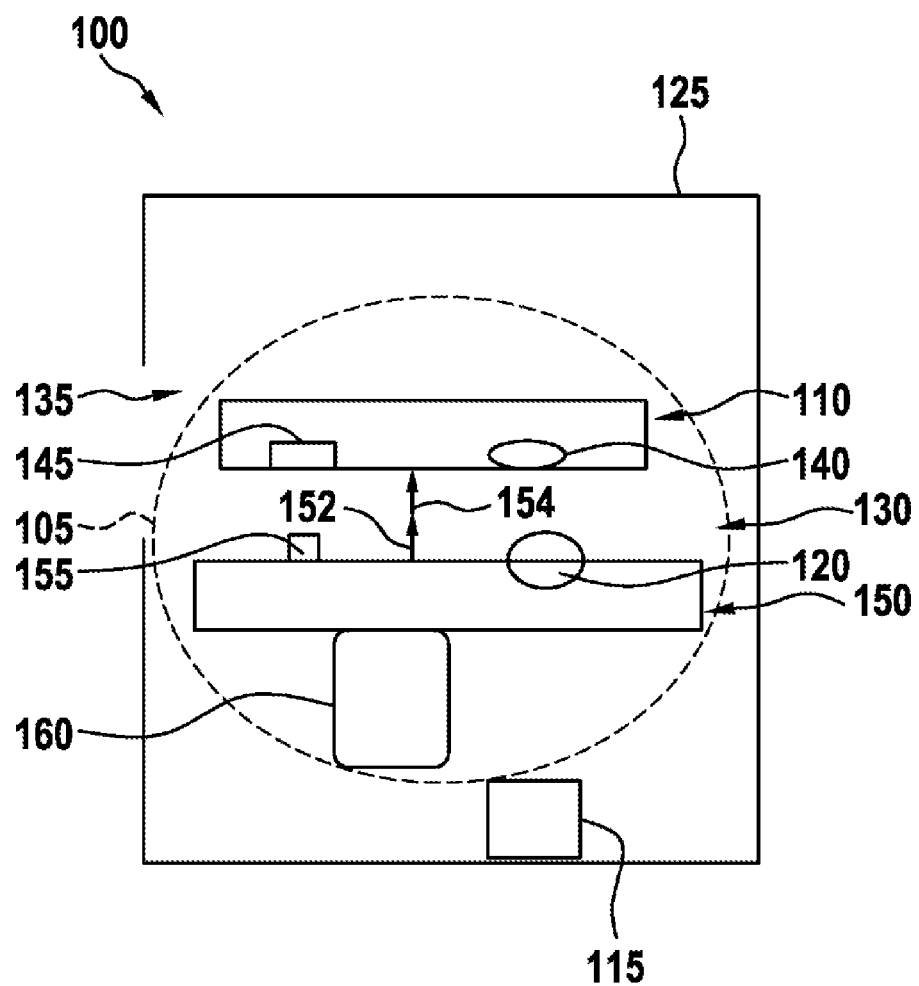
FIG. 1 shows a schematic view of a lab-on-a-chip analyzer having a device for coupling a cartridge according to one illustrative embodiment.

FIG. 1 shows a schematic view of a lab-on-a-chip analyzer 100 having a device 105 for coupling a cartridge 110 according to one illustrative embodiment. The figure also shows the cartridge 110 received in the device 105. Besides the device 105, the lab-on-a-chip analyzer 100 comprises a pressure mechanism 115 for making available a pneumatic pressure for a pneumatic interface 120 of the device 105. Moreover, the lab-on-a-chip analyzer 100 has a housing 125 with a cartridge opening 135 which leads into a receiving region 130 and through which the cartridge 110 is introduced into the lab-on-a-chip analyzer 100. The cartridge 110 has a pneumatic port 140 and at least one reagent chamber 145.

The device 105 comprises a clamping unit 150 arranged adjacent to the receiving region 130. The receiving region 130 is configured to receive the cartridge 110. The clamping unit 150 comprises the pneumatic interface 120 for pneumatically contacting the pneumatic port 140, and a punch 155 for introducing into the reagent chamber 145. The pneumatic interface 120 and the punch 155 are arranged on a side of the clamping unit 150 directed toward the receiving region 130. The clamping unit 150 is designed to execute a first translatory movement 152 in the direction of the receiving region 130. By means of the first translatory movement 152, the pneumatic interface 120 is brought into contact with the pneumatic port 140. According to one illustrative embodiment, the punch 155 is already inserted partially into the reagent chamber 145 by the first translatory movement 152. According to an alternative illustrative embodiment, the punch 155 is not yet inserted into the reagent chamber 145 by the first translatory movement 152. Moreover, the clamping unit 150 is designed to execute a second translatory movement 154 in the direction of the receiving region 130, subsequent to the first translatory movement 152, in order to insert the punch 155 into the reagent chamber 145, i.e. to begin the insertion of the punch 155 into the reagent chamber 145 or to continue the insertion of the punch 155. The first and second translatory movements 152, 154 can be interpreted as parts of a continuous movement. This continuous movement can be executed with constant or varying speed. According to one illustrative embodiment, the punch 155 is configured to be able to be inserted with an exact fit into the reagent chamber 145.

Moreover, the device 105 according to the illustrative embodiment shown here has a drive mechanism 160. The drive mechanism 160 is designed to effect the first and second translatory movements 152, 154 of the clamping unit 150. Alternatively, the drive mechanism 160 can be part of the lab-on-a-chip analyzer 100.

The device 105 for the lab-on-a-chip analyzer 100 is configured to deliver a pneumatic pressure, in particular a positive pressure, to the cartridge 110, hereinafter also called a lab-on-a-chip cartridge 110, and thereafter to insert or further insert the punch 155 into the cartridge 110. The structure of the device 105 is compact here. The first translatory movement 152, effected in the illustrative embodiment shown here by the drive mechanism 160, is executed by means of the device 105 in order to dock the pneumatic interface 120 of the clamping unit 150 onto the lab-on-a-chip cartridge 110. After the pneumatic contact has been established, the second translatory movement 154 is executed so as to introduce or further introduce the punch 155 into the cartridge 110, in order, by means of the mechanical movement, to pierce a sealing foil, which seals the reagent chamber 145, and thereby release reagents into a fluidic network of the cartridge 110. An elastic barrier foil, which is not destroyed, still separates the punch 155 and the sealing foil. Alternatively, a displacement of a volume of a liquid contained in the reagent chamber 145 is effected only by a deflection of the barrier foil, which results in a movement in the fluidic network of the cartridge 110. For this purpose, the cartridge 110 is clamped between two planes and the pneumatic interface 120 contained in the clamping unit 150 and the punch 155.

Figure 2:
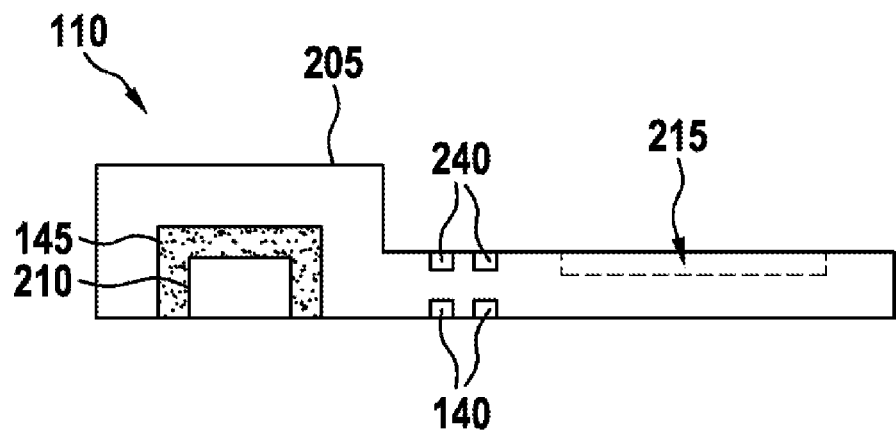
FIGS. 2 to 5 each show a schematic view of a cartridge for a lab-on-a-chip analyzer according to one illustrative embodiment.
Figure 4:
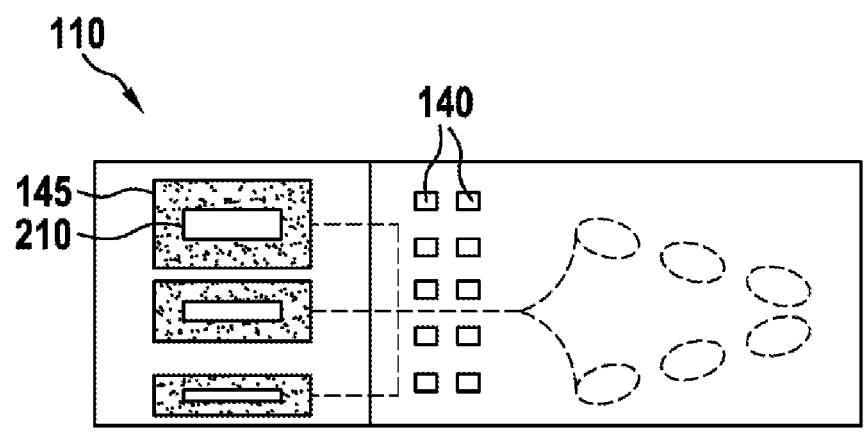

FIG. 2 shows a schematic view of a cartridge 110 for a lab-on-a-chip analyzer according to one illustrative embodiment. The cartridge 110 has a substrate as support structure 205. The figure shows a cross section of a side view of the cartridge 110, which corresponds to or is similar to the cartridge described with reference to FIG. 1. The cartridge 110 has a substrate as support structure 205. On one side of the support structure 205 there is at least one reagent chamber 145 and at least one pneumatic port 140. According to this illustrative embodiment, the support structure 205 comprises at least one further pneumatic port 240, which is arranged on a side of the support structure 205 opposite the at least one pneumatic port 140. For example, the cartridge 110 here has a plurality of pneumatic ports 140, 240, of which two pneumatic ports 140 on the underside of the cartridge 110 and two further pneumatic ports 240 on the upper face of the cartridge 110 are shown in the sectional views illustrated. The reagent chamber 145 optionally comprises a separated reagent portion 210, such that two different reagents can be received in the reagent chamber 145 and can be separated from each other by a membrane, for example. According to one illustrative embodiment, the cartridge 110 has a plurality of correspondingly configured reagent chambers 145, as shown in FIG. 4. In the illustrative embodiment shown here, the reagent chamber 145 is filled for example with one or more liquids, such as a buffer, and sealed with a sealing foil, for example an aluminum composite foil. The reagent chamber 145 can be embodied as a separate insert part in the cartridge 110 and can be clamped or otherwise fixed in the support structure 205 of the cartridge 110. The sealing foil can be arranged approximately at the height of the surface of the support structure 205 adjoining the reagent chamber 145.

Moreover, according to the illustrative embodiment shown here, the cartridge comprises a network 215 of pneumatic and fluidic channels, hereinafter also called a fluidic network 215. The pneumatic and fluidic channels are separated from each other by a flexible membrane. By means of positive and negative pressure conveyed through the pneumatic channels, the flexible membrane is deflected at the locations of chambers and valves in the fluidic network 215, such that liquids in the fluidic network 215 are moved. The valves make it possible in the same way to shut off a fluidic channel and thus suppress the transport of the liquids. In particular, such a valve is positioned directly at an outlet of the reagent chamber 145 in order to suppress the passage of the liquids from the reagent chamber 145 into the fluidic network. Moreover, a fluidic transfer chamber, in which the liquid can be temporarily stored, is in each case optionally arranged between the reagent chamber 145 and the corresponding valve. The pneumatic ports 140, 240 form the interface in the cartridge 110 to the lab-on-a-chip analyzer, in order to convey the positive or negative pressure in the form of air or another gas to the cartridge 110. For example, the cartridge 110 here has two pneumatic ports 140 on the underside of the cartridge 110 and two further pneumatic ports 140 on the upper face of the cartridge 110. Alternatively, the cartridge 110 has pneumatic ports 140, 240 positioned only on one side. According to this illustrative embodiment, each pneumatic port 140, 240 leads to at least one fluidic valve or a fluidic chamber on the cartridge 110.

Figure 3:
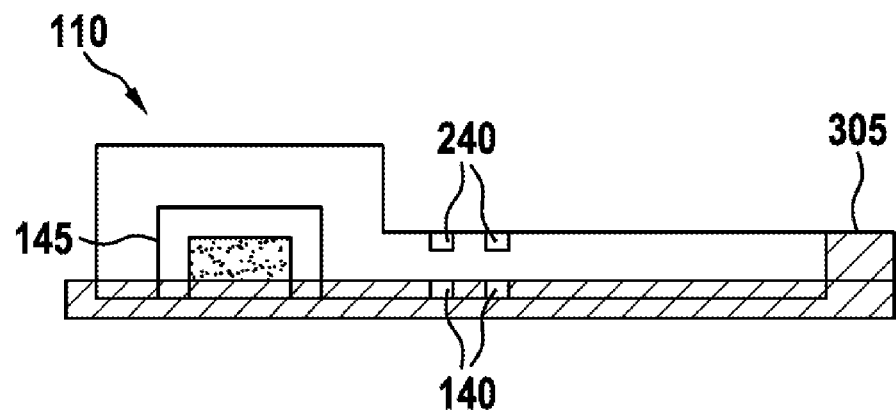

FIG. 3 shows a schematic view of a cartridge 110 for a lab-on-a-chip analyzer according to one illustrative embodiment. The cartridge 110 corresponds to or is similar to the cartridge from FIG. 1, with a correspondingly configured reagent chamber 145 and with the example of four pneumatic ports 140, 240. In addition, the cartridge 110 here comprises a guide frame 305. The guide frame is configured for inserting the cartridge 110 into the lab-on-a-chip analyzer. The guide frame 305 is made from a metal, such as aluminum or stainless steel, or from plastics. If the cartridge 110 is fitted by a user into the lab-on-a-chip analyzer, the cartridge 110 optionally has the guide frame 305 shown here. The cartridge 110 with the guide frame is pulled into the lab-on-a-chip analyzer and positioned, or it is positioned manually in the lab-on-a-chip analyzer. The correct connection of the guide frame 305 to other elements of the cartridge 110 is detected optionally by means of a sensor before the cartridge 110 with the guide frame 305 is moved in the lab-on-a-chip analyzer.

FIG. 4 shows a schematic view of a cartridge 110 for a lab-on-a-chip analyzer according to one illustrative embodiment. The figure shows a view of the cartridge 110 from below. The cartridge 110 shown here corresponds to or is similar to the cartridge from FIG. 1. For example, the cartridge 110 here comprises a unit composed of three reagent chambers 145 which lie alongside each other and which, as shown here, optionally have different dimensions. The cartridge optionally has a plurality of units of reagent chambers 145, for example two or three units of three reagent chambers 145. Each reagent chamber 145 optionally has at least one separate reagent portion 210, such that, depending on the design, each of the reagent chambers 145 can store one, two or, in the case of several reagent portions 210 per reagent chamber 145, three or more different reagents. Moreover, the cartridge 110 has for example ten pneumatic ports 140 arranged at uniform intervals. The pneumatic ports 140 are arranged here in two rows, for example. The fluidic network 215 is fluidically connected to the reagent chambers 145.

Figure 5:
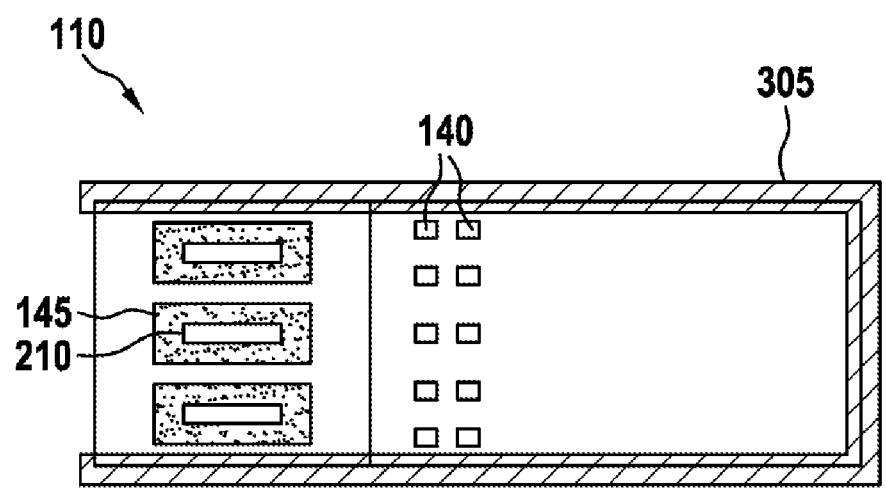

FIG. 5 shows a schematic view of a cartridge 110 for a lab-on-a-chip analyzer according to one illustrative embodiment. The cartridge corresponds to or is similar to the cartridge from FIG. 4. In the illustrative embodiment shown here, it additionally comprises the guide frame 305. The view of the cartridge 110 is the same as in FIG. 4.

Figure 6:
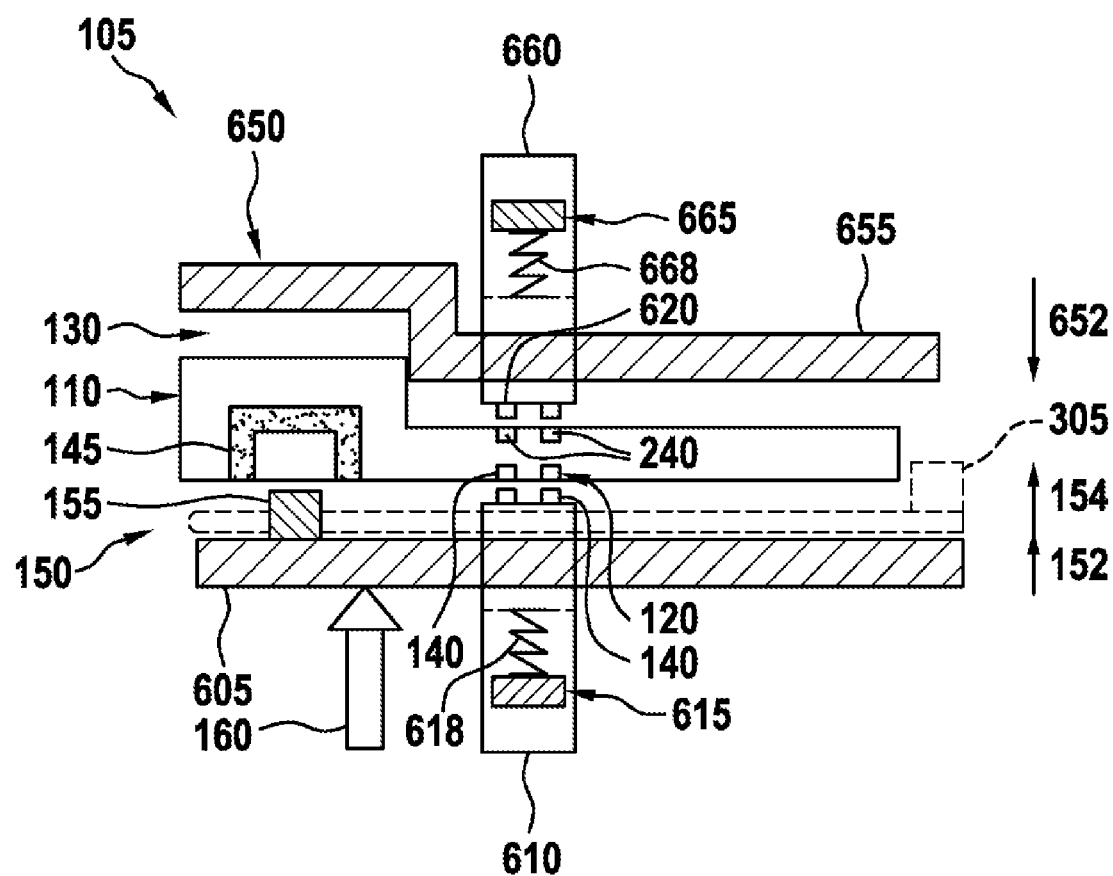
FIGS. 6 to 7 each show a schematic view of a device for coupling a cartridge for a lab-on-a-chip analyzer according to one illustrative embodiment.

FIG. 6 shows a schematic view of a device 105 for coupling a cartridge 110 for a lab-on-a-chip analyzer according to one illustrative embodiment. The figure shows a cross section of a side view of the device 105 in which the cartridge 110 is arranged. The cartridge 110 corresponds to or is similar to the cartridge from FIG. 3, with a correspondingly configured reagent chamber 145 and with the example of two pneumatic ports 140 and further pneumatic ports 240 and with the guide frame 305. The device 105 has the receiving region 130 and the clamping unit 150 and also the drive mechanism 160.

According to the illustrative embodiment shown here, the clamping unit 150 has a support 650 on which the punch 155 is arranged. In addition, the clamping unit 155 has a piston 610 which is movable relative to the support 605 and on which the pneumatic interface 120 is arranged. The clamping unit 150 additionally has a spring mechanism 615 with at least one spring 618, wherein the spring 618 is coupled to the support 605 and to the piston 610 and is deformed in response to the first translatory movement 152. For example, two pneumatic interfaces 120 are arranged here on the piston for the pneumatic contacting of the two pneumatic ports 140.

Moreover, the device 105 optionally has a further clamping unit 650. According to the illustrative embodiment shown here, the further clamping unit 650 is arranged adjacent to the receiving region 130. In addition, the further clamping unit 650 is arranged lying opposite the clamping unit 150. The clamping unit 150 is here shown as a lower clamping unit 150, and the further clamping unit 650 is shown as an upper clamping unit 650. Alternatively, the clamping unit 150 can also be arranged above and the further clamping unit 650 below, or the clamping unit 150 and the further clamping unit 650 are positioned on opposite sides depending on the design of the receiving region 130.

As shown here, the further clamping unit 650 optionally has a further pneumatic interface 620 for the pneumatic contacting of a further pneumatic port 240 of the cartridge 110. For example, two further pneumatic interfaces 620 are shown here for the contacting of the two further pneumatic ports 240. In the illustrative embodiment shown here, the further clamping unit 650 moreover has a further support 655, a further piston 660, a further spring mechanism 665 and a further spring 668, which are configured corresponding to the support 605, the piston 610, the spring mechanism 615 and the spring 618. Accordingly, the further pneumatic interface 620 is arranged on the further piston 660.

According to the illustrative embodiment shown here, for the contacting of the pneumatic port 140 and the further pneumatic port 240 and for introducing the punch 155 into the reagent chamber 145 in order to release reagents located in the reagent chamber 145 by means of the punch 155, the cartridge 110 is clamped between the clamping unit 150, hereinafter also called the lower clamping unit 150, and the further clamping unit 650, hereinafter also called the upper clamping unit 650. On the lower clamping unit 150, the punch 155 is mounted on the support 605 of the clamping unit 150 so as to correspond to the reagent chamber 145.

According to one illustrative embodiment, the upper clamping unit 650 is mounted fixedly in the analyzer and forms the so-called zero plane, also zero plate. The lower clamping unit 150 is operated by a motor of the drive mechanism 160 and is moved, in a plane parallel to the upper clamping unit 650, in the direction of the upper clamping unit 650 in order to execute the first and second translatory movement 152, 154. In this case, the upper clamping unit 650 can be connected rigidly to the lab-on-a-chip analyzer. Alternatively, the upper unit is configured as clamping unit 150, and the lower unit is configured as further clamping unit 650. In this case, the upper unit can be moved and the lower unit can be connected rigidly to the lab-on-a-chip analyzer. Alternatively, the further clamping unit 650 is designed to execute a further translatory movement 652 in the direction of the receiving region 130. The clamping unit 150 and the further clamping unit 650 are in this case driven by the same drive mechanism 160 and are designed to move toward each other, and the drive mechanism 160 is designed to effect also the further translatory movement 652. Alternatively, two separate drive mechanisms 160 are provided for moving the two clamping units 150, 650.

An example of a use of the device 105 according to the illustrative embodiment shown here is described below: The pistons 610, 660, hereinafter also called manifolds 610, 660, are mounted on the clamping units 150, 650. The pistons 610, 660 are resiliently mounted by means of the compression springs 618, 668 of the spring mechanisms 615, 665. The pneumatic interfaces 120, 620 protrude from the supports 605, 655. The spring mechanisms 615, 665 optionally have two springs 618, 668 per piston. The pistons 610, 660 are mounted on the supports 605, 655 by means of two set screws, for example, and are pressed against the cartridge 110 by means of the compression springs 618, 668 integrated in the screws. In this way, an optimally uniform pressing force of the piston 610, 660 onto the cartridge 110 is permitted, and adjustment tolerances of the piston 610, 660 to the cartridge 110 are compensated. The manifolds 610, 660 are configured to deliver the positive or negative pressure to the pneumatic ports 140, 240 of the cartridge 110. The manifolds 610, 660 optionally contain, for each pneumatic port 140, 240, a valve that can switch between negative pressure and positive pressure. The positive and negative pressure is made available in each case by a pump of the pressure mechanism of the lab-on-a-chip analyzer. The first translatory movement 152 is executed, driven by the motor of the drive mechanism 160, and the cartridge 110 is lifted out of the guide frame 305 in the direction of the upper clamping unit 650. The interfaces to the cartridge 110, the pneumatic interfaces 120, 620 and therefore the manifolds 610, 660 and the punch 155 touch the cartridge 110. An optional sensor, for example a light barrier or an encoder, detects the moment as soon as the manifolds 610, 660 dock onto the cartridge 110, as a result of which the positive pressure is forwarded to the pneumatic ports 140, 240, which shut off the reagent chamber 145 from the fluidic system. An elastic seal is optionally mounted between the manifold 610, 660 and the pneumatic ports 140, 240 of the cartridge 110. It can be mounted on the manifolds 610, 660 or on the cartridge 110 in order to connect the pneumatic interfaces 120, 620 in a pneumatically tight manner to the pneumatic ports 140, 240. To achieve rapid delivery of the positive pressure to the cartridge 110 during the pressing-on procedure, without waiting for the pressure to build up in the pump, the pressure mechanism of the lab-on-a-chip analyzer optionally has a pressure vessel which, by means of a switching valve, releases the positive pressure to the cartridge 110. The pistons 610, 660 can have correspondingly configured switching valves for the individual pneumatic ports 140, 240, which valves can also be already switched to the positive-pressure path before the pressing-on procedure. By means of the second translatory movement 154, the pressing-on procedure is continued after the pneumatic contact. The punch 155 plunges completely into the reagent chamber 145, as is shown in FIG. 7 described below.

Thus, according to one illustrative embodiment, during the first translatory movement 152 the support 605 together with the punch 155 and the pneumatic interface 120 is moved in the direction of the cartridge 110. In this way, the pneumatic interface 120 is pressed against the pneumatic ports 140. On account of the movable and resilient bearing of the pneumatic interface 120 with respect to the support 605, the movement of the pneumatic interface 120 in the direction of the cartridge 110 can slow down or come to a stop if the pneumatic interface 120 presses against the pneumatic ports 140. The first translatory movement 152 of the support 605 can be continued further in order to further increase the pressure of the pneumatic interface 120 against the pneumatic ports 140. Optionally, the punch 155 is already partially inserted into the reagent chamber 145 during the first translatory movement 152. During the second translatory movement 154, the support 605 together with the punch 155 is moved further in the direction of the cartridge 110, for example until the punch 155 has reached a maximum depth of insertion in the reagent chamber 145. The pneumatic interface 120 can likewise be moved further in the direction of the cartridge 110, optionally with slowing down, or can be located opposite the cartridge 110 at a standstill.

Figure 7:
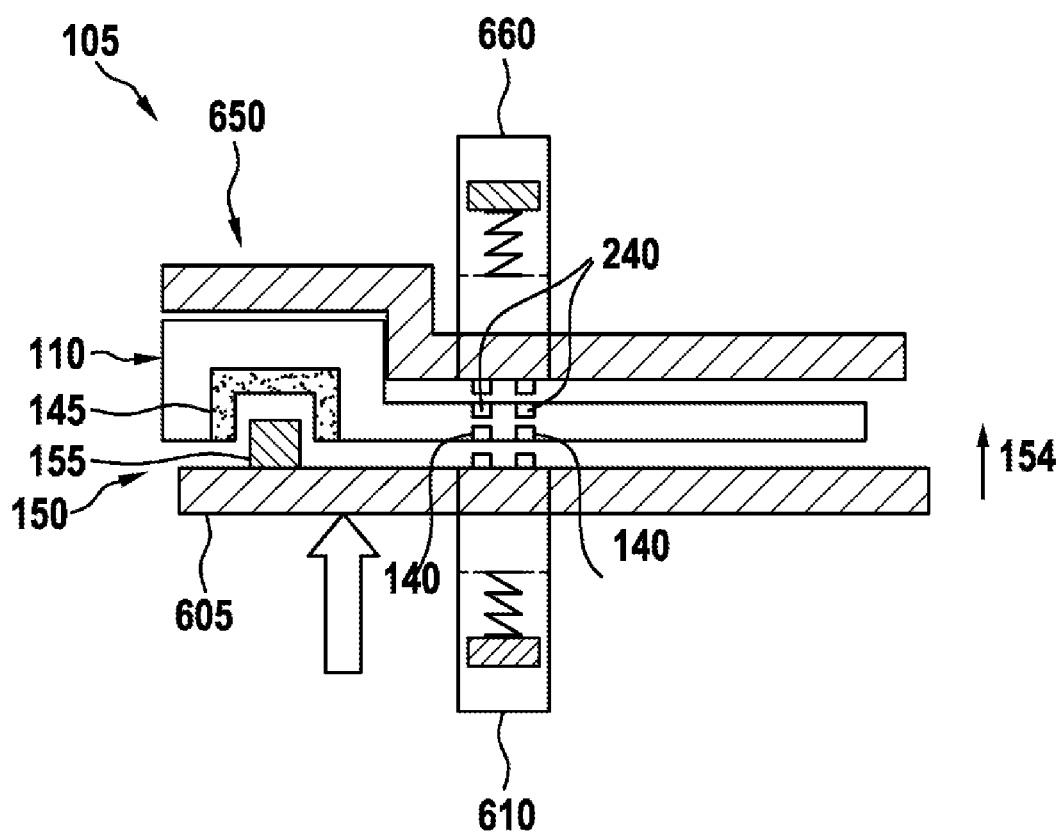

FIG. 7 shows a schematic view of a device 105 for coupling a cartridge 110 for a lab-on-a-chip analyzer according to one illustrative embodiment. This figure shows a further situation of the device 105 described with reference to FIG. 6. The situation shown here is the execution of the second translatory movement 154. The manifolds 610, 660 are displaced by means of compression springs 618, 668 toward the cartridge 10 by a shorter distance than the rest of the displacement path of the punch 155. The punch 155 tears open a sealing foil of the reagent chamber 145, as a result of which the liquid stored in the reagent chamber 145 is displaced and flows into a preliminary storage chamber. This preliminary storage chamber is separated, however, from the rest of the fluidic network by the preceding pneumatic actuation effected by means of the first translatory movement, which prevents entry of the liquids into the network. Between the punch 155 and the sealing foil, an elastic membrane is present in the cartridge 110, which membrane is not destroyed by the punch 155 and prevents movement of liquids into the lab-on-a-chip analyzer. The liquids can therefore only pass into corresponding transfer chambers. Additionally or alternatively, it is possible, by means of the punch 155, to open only a fluidic connection between the reagent chamber 145 and the target location, e.g. the transfer chamber. Alternatively, it is possible that only the elastic barrier foil is deflected by the punch 155, and no explicit sealing foil is destroyed, and therefore the liquid is displaced between two positions of the reagent chamber 145 and a target location, e.g. the transfer chamber. After the contacting of the pneumatic ports 140, 240 has taken place and the reagents have been released by means of the punch 155, the fluidic sequence on the cartridge 110 is started, and, after the valves of the transfer chambers have opened, the reagents are transported to corresponding reaction sites on the cartridge 110. During the processing, the cartridge 110 remains clamped between the clamping unit 150 and the further clamping unit 650, and it is freed from the device 105 again only after completion of the analysis detection by the lab-on-a-chip analyzer.

Figure 8:
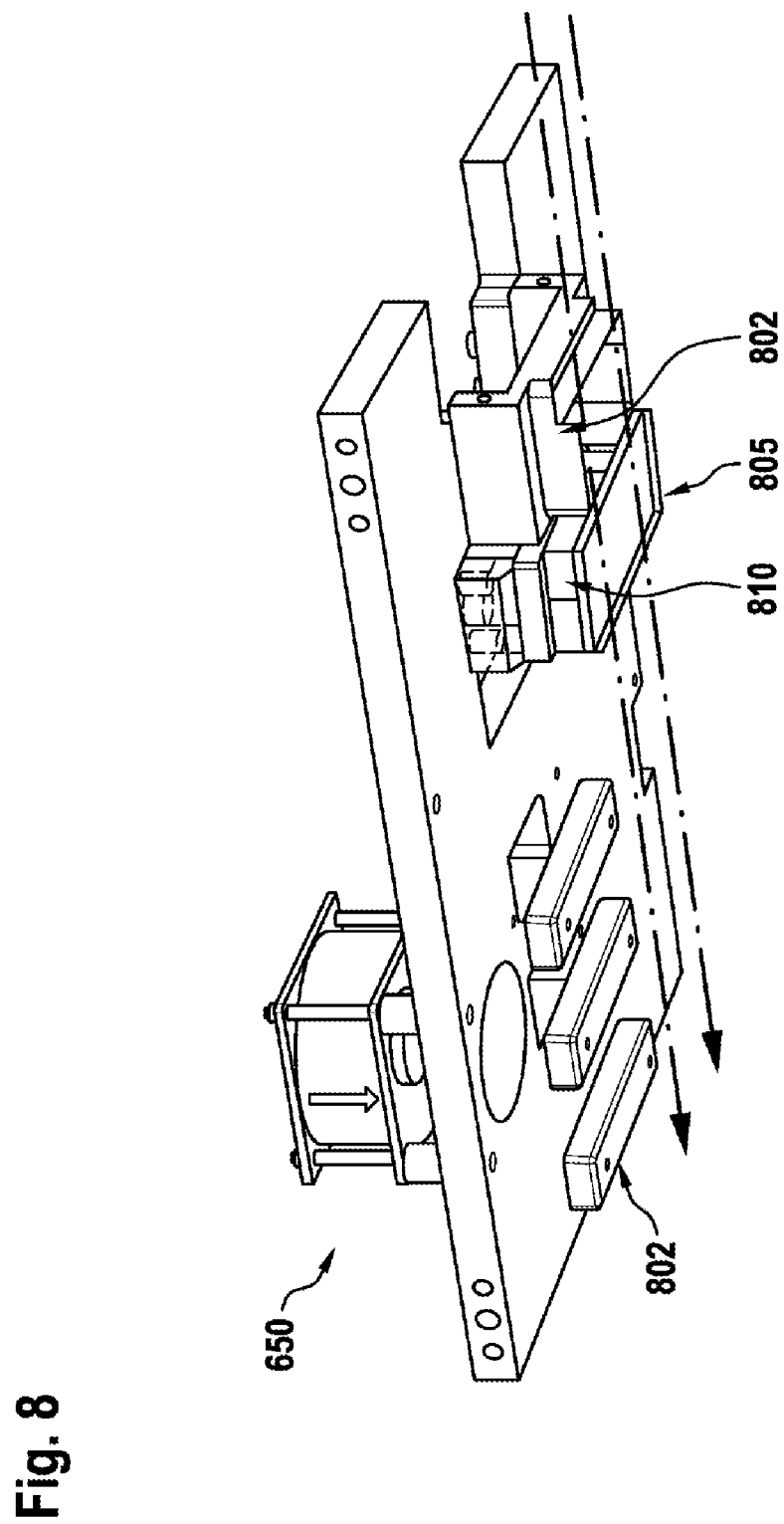
FIG. 8 shows a schematic view of a further clamping unit of a device for coupling a cartridge for a lab-on-a-chip analyzer according to one illustrative embodiment.

FIG. 8 shows a schematic view of a further clamping unit 650 of a device for coupling a cartridge for a lab-on-a-chip analyzer according to one illustrative embodiment. The further clamping unit 650 is shown in a side view from below and corresponds to or is substantially similar to the further clamping unit described above with reference to FIGS. 6 and 7. The further clamping unit 650 shown here can be mounted, as an upper clamping unit, fixedly into the lab-on-a-chip analyzer and can thus define a fixed reference plane 802, a so-called zero plate. The reference plane 802 is marked here by two arrows.

According to one illustrative embodiment, the further clamping unit 650 has a further interface for thermal, optical and/or mechanical contacting of the cartridge. Optionally, the further clamping unit 650 additionally or alternatively has the further interface 605 for the thermal, optical and/or mechanical contacting of the cartridge, as in the illustrative embodiment shown here. The further interface 805 is designed here for thermal contacting of the cartridge and is configured for example as a heating zone with a heating element 810. The further interface 805 is optionally movable with respect to the reference plane 802 and, for this purpose, is in particular arranged on the piston which is spring-mounted by means of the compression spring. In relation to the reference plane 802, the further interface 805, with the heating element, and the piston are arranged in an oversprung manner.

Figure 9:
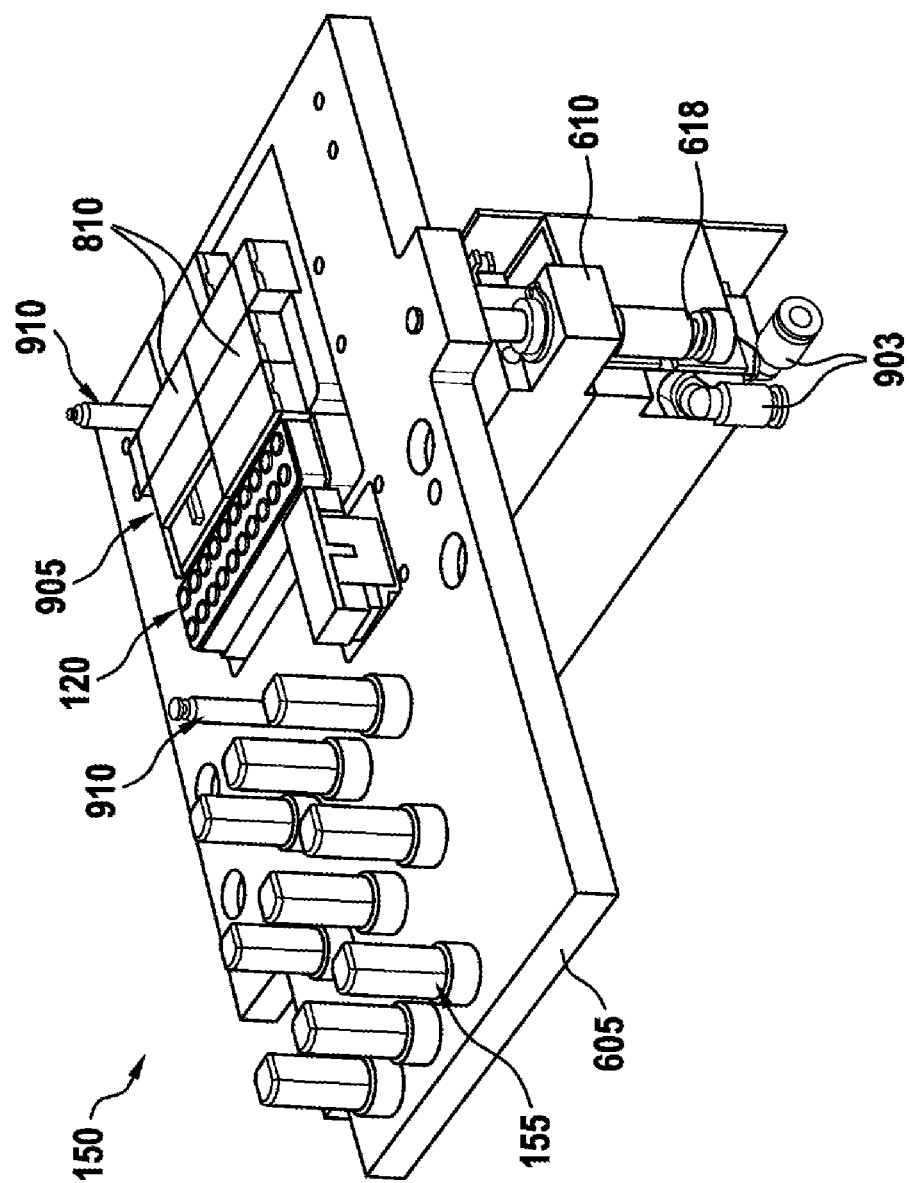
FIG. 9 shows a schematic view of a clamping unit of a device for coupling a cartridge for a lab-on-a-chip analyzer according to one illustrative embodiment.

FIG. 9 shows a schematic view of a clamping unit 150 of a device for coupling a cartridge for a lab-on-a-chip analyzer according to one illustrative embodiment. The clamping unit 150 is shown in a side view from above and corresponds to or is substantially similar to the clamping unit from one of the aforementioned figures. According to the illustrative embodiment shown here, the clamping unit has a support 605 on which the punch 155 is arranged. For example, the support 605 here has nine elongate punches 155, which are arranged at uniform intervals from each other. Moreover, the clamping unit 150 has the piston 610, movable in relation to the support 605, with the pneumatic interface 120. The piston 610 is resiliently mounted by means of the compression spring 618. According to the illustrative embodiment shown here, the piston 610 moreover has a pneumatic switching valve 905 coupled to the pneumatic interface 120. For example, two switching valves 903 are shown here.

According to the illustrative embodiment shown here, the clamping unit 150 has the further interface 905 for thermal, optical and/or mechanical contacting of the cartridge. For example, the clamping unit 150 here comprises five further interfaces 905, of which two, for thermal contacting, each comprise a heating element 810. Additionally or alternatively, the further interface 905 comprises at least one cooling element in order to form one or more cooling zones. For mechanical contacting of the cartridge, the further interface 905 optionally comprises ultrasonically operated sonotrodes in order, by means of movement of a membrane of the cartridge in a reagent volume, to bring about cavitation for cell lysis. For optical contacting, the clamping unit 150 has an optics unit as further interface, wherein the optics unit has in particular one of the following elements: a camera chip with optical filter elements, a photodetector, an objective lens, or LEDs with optical color filters for fluorescence excitation and optical detection. The further interfaces are optionally docked onto the cartridge by means of the first translatory movement. The further interfaces are optionally arranged on the piston 610 and are designed to dock onto the cartridge in an oversprung manner. The stated embodiments of the further interface 905 are optionally formed additionally or alternatively on the further clamping unit. In particular, the further interface 905 for optical contacting is formed on the further clamping unit, if the further clamping unit is mounted fixedly, according to one illustrative embodiment, to permit a degree of positioning accuracy in the micrometer range.

According to the illustrative embodiment shown here, the clamping unit 150 moreover has at least one positioning pin 910. The positioning pin 910 is designed to position the cartridge. Here, the clamping unit 150 has for example two positioning pins 910 arranged on the support 605. The positioning pin 910 is optionally configured to engage in the guide frame of the cartridge or onto another element of the cartridge, in order to position and additionally stabilize the cartridge. The positioning of the cartridge by means of the at least one positioning pin 910 is effected by means of the first translatory movement of the clamping unit 150.

An example of a use of the embodiment of the clamping unit 150 shown here is described below: At the moment the cartridge is lifted out of the guide frame, two positioning pins 910, also called guide pins, travel in two guide holes of the cartridge during the first translatory movement 152, in order thereby to laterally position the cartridge. Thus, by means of the first translatory movement 152, an exact lateral positioning in the range of below +/−0.3 millimeter is also possible. The cartridge in this case has a round hole and, as far away as possible, an oblong hole. The diameter of the positioning pins 910 on the clamping unit and the dimensions of the round and oblong holes define the adjustment tolerance of the cartridge in the plane. By means of the first translatory movement, the further interfaces 905 with heating or cooling zones, with the optics unit including the camera chip and objective lens and fluorescence excitation LEDS and a sonotrode for cell lysis, are also docked onto the cartridge. The lateral positioning of the cartridge can be assisted by the entry of the positioning pins 910 as adjustment pins likewise by the same translatory movement.

Figure 10:
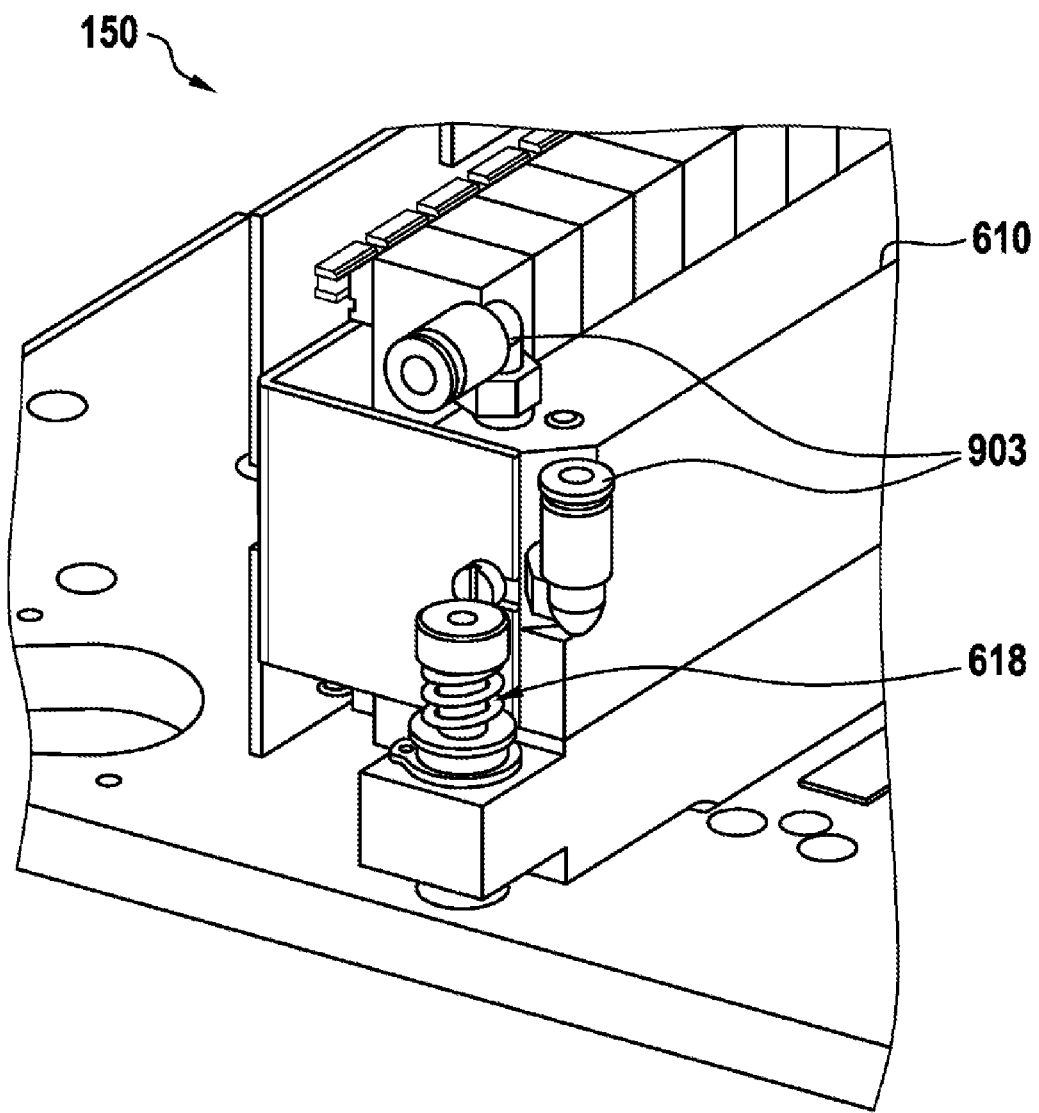
FIG. 10 shows a schematic view of a part of a clamping unit of a device for coupling a cartridge for a lab-on-a-chip analyzer according to one illustrative embodiment.

FIG. 10 shows a schematic view of part of a clamping unit 150 of a device for coupling a cartridge for a lab-on-a-chip analyzer according to one illustrative embodiment. The clamping unit 150 corresponds to or is similar to the clamping unit of one of the figures mentioned above. As part of the clamping unit 150, a portion of the piston 610 with the compression spring 618 and two switching valves 903 is shown in a side view. The piston 610 is optionally mounted by means of two compression springs 618 like the spring 618 shown here, in order to couple the pneumatic interface resiliently to the cartridge.

Figure 11:
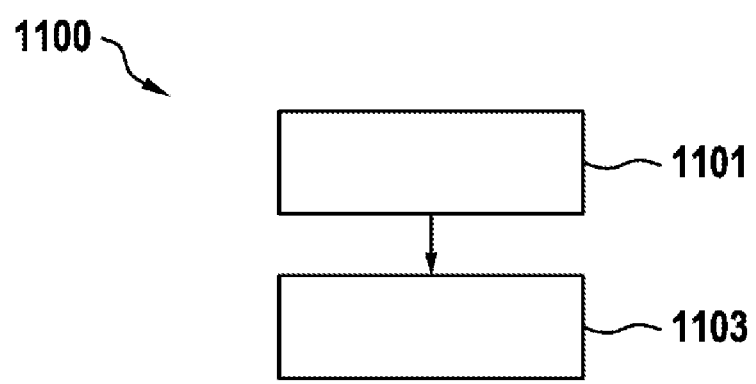
FIG. 11 shows a flow diagram of a method for coupling a cartridge for a lab-on-a-chip analyzer according to one illustrative embodiment.

FIG. 11 shows a flow diagram of a method 1100 for coupling a cartridge for a lab-on-a-chip analyzer according to one illustrative embodiment. The method 1100 is carried out using an embodiment of the device as described with reference to the preceding figures. The cartridge has at least one pneumatic port and at least one reagent chamber. The method 1100 has at least one step 1101 of the first translatory movement and one step 1103 of the second translatory movement. In step 1101, the first translatory movement of the clamping unit in the direction of the receiving region is executed, in order to bring the pneumatic interface into contact with the pneumatic port and optionally to already insert the punch partially into the reagent chamber. In step 1103, the second translatory movement of the clamping unit in the direction of the receiving region is executed, in order to insert the punch into the reagent chamber for the first time or to insert it further therein, wherein the second translatory movement is subsequent to the first translatory movement. In step 1101, a further interface is optionally brought into contact with the cartridge by means of the first translatory movement. Additionally or alternatively, the cartridge is optionally positioned by means of the at least one positioning pin. Step 1103 is carried out such that, by means of the insertion of the punch, a reagent contained in the reagent chamber is released.

Where an illustrative embodiment comprises an "and/or" link between a first feature and a second feature, this is to be understood as meaning that the illustrative embodiment, in one form, has both the first feature and also the second feature and, in another form, has either only the first feature or only the second feature.

The invention claimed is:

1. A device for coupling a cartridge with a lab-on-a-chip analyzer, the cartridge having at least one pneumatic port and at least one reagent chamber, the device comprising:
   a housing;
   a receiving region defined within the housing and accessible through an opening in the housing, the receiving region configured to receive the cartridge by insertion of the cartridge through the opening into the defined receiving region; and
   a clamping unit comprising:

a pneumatic interface configured to pneumatically contact the at least one pneumatic port; and a punch configured to be introduced into the at least one reagent chamber, wherein the clamping unit is arranged adjacent to the receiving region, wherein the clamping unit is designed to execute a first translatory movement in a direction toward the receiving region to bring the pneumatic interface into contact with the at least one pneumatic port, and wherein the clamping unit is designed to execute a second translatory movement in the direction toward the receiving region, subsequent to the first translatory movement, to insert the punch to a final position at least partially within the reagent chamber.

2. The device as claimed in claim 1, wherein:

the clamping unit has a support on which the punch is arranged, the clamping unit has a piston which is movable relative to the support and on which the pneumatic interface is arranged, wherein the clamping unit has a spring mechanism with at least one spring, and wherein the spring is coupled to the support and the piston and is deformed in response to the first translatory movement.

3. The device as claimed in claim 2, wherein the piston has at least one pneumatic switching valve fluidically coupled to the pneumatic interface.

4. The device as claimed in claim 1, wherein the clamping unit has at least one positioning pin configured to position the cartridge.

5. The device as claimed in claim 1, wherein the clamping unit has a further interface for thermal, optical and/or mechanical contacting of the cartridge.

6. The device as claimed in claim 1, further comprising:

a drive mechanism designed to effect the first and second translatory movements of the clamping unit.

7. The device as claimed in claim 1, further comprising:

a further clamping unit which, adjacent to the receiving region, is arranged lying opposite the clamping unit.

8. The device as claimed in claim 7, wherein the further clamping unit has a further pneumatic interface configured to pneumatically contact a further pneumatic port of the cartridge.

9. The device as claimed in claim 7, wherein the further clamping unit is designed to execute a further translatory movement in the direction of the receiving region.

10. The device as claimed in claim 1, wherein:

the clamping unit is configured to execute the first translatory movement to insert the punch to a first position partially within the reagent chamber, and the clamping unit is configured to execute the second translatory movement to insert the punch from the first position to the final position deeper within the reagent chamber.

11. A lab-on-a-chip analyzer comprising:

a device for coupling a cartridge with the lab-on-a-chip analyzer, the cartridge having at least one pneumatic port and at least one reagent chamber, the device comprising:

a housing;

a receiving region defined within the housing and accessible through an opening in the housing, the receiving region configured to receive the cartridge by insertion of the cartridge through the opening into the defined receiving region; and a clamping unit comprising:

a pneumatic interface configured to pneumatically contact the at least one pneumatic port; and a punch configured to be introduced into the at least one reagent chamber, wherein the clamping unit is arranged adjacent to the receiving region, wherein the clamping unit is designed to execute a first translatory movement in a direction toward the receiving region to bring the pneumatic interface into contact with the at least one pneumatic port, and wherein the clamping unit is designed to execute a second translatory movement in the direction toward the receiving region, subsequent to the first translatory movement, to insert the punch into a final position at least partially within the at least one reagent chamber;

a pressure mechanism configured to supply pneumatic pressure at the pneumatic interface.

12. A method for coupling a cartridge with a lab-on-a-chip analyzer, the cartridge having at least one pneumatic port and at least one reagent chamber, the method comprising:

executing a first translatory movement of a clamping unit of a device of the lab-on-a-chip analyzer in a direction toward a receiving region of the device, the receiving region defined within a housing and accessible through an opening in the housing, the receiving region configured to receive the cartridge by insertion of the cartridge through the opening into the defined receiving region and arranged adjacent to the clamping unit, to bring a pneumatic interface of the clamping unit into contact with the at least one pneumatic port; and executing a second translatory movement of the clamping unit in the direction toward the receiving region, to insert a punch of the clamping unit into a final position at least partially within the at least one reagent chamber, the executing of the second translatory movement subsequent to the executing of the first translatory movement.

* * * * *